Patented Aug. 24, 1954

2,687,441

UNITED STATES PATENT OFFICE 2,687,441

PREPARATION OF FLUORINATED ORGANIC COMPOUNDS

Edward H. Price, West Chester, Pa., and William S. Johnson, Madison, Wis., assignors to E. I. du Pont de Nemours and Company, Wilmington, Del., a corporation of Delaware No Drawing. Application February 8, 1952, Serial No. 270,743

6 Claims. (Cl. 260—653)

This invention relates to the preparation of fluorinated organic compounds by chemical reduction of other fluorinated organic compounds. More particularly, this invention relates to the preparation of monochlorodifluoromethane from dichlorodifluoromethane.

The Benning et al. patent, U. S. 2,551,573, claims a process for preparing tetrafluoroethylene by pyrolysis of monochlorodifluoromethane. Since tetrafluoroethylene can be polymerized to form a valuable product, it is important that an economical source of the monomer be obtained.

It is an object of the present invention to prepare monochlorodifluoromethane by a new and improved process which is less expensive and more expedient than processes heretofore known. It is another object of the present invention to prepare other fluorinated methanes by the chemical reduction of dichlorodifluoromethane. Other objects are more fully set forth below.

The above-mentioned objects are accomplished in accordance with the present invention by reaction between dichlorodifluoromethane and a reducing agent, such as metallic zinc in an aqueous medium.

In the preferred embodiment of this invention, dichlorodifluoromethane, a reducing agent, and a catalyst are mixed with water and agitated in a closed container for a period of about 7 hours at about 45° C. The resultant product is comprised of monochlorodifluoromethane and other halogenated products. The following examples are cited to show the operability of the invention.

Example 1.—Into a 250 ml. stainless steel tube were placed 0.5 mol $CCl_2F_2$, 0.25 mol zinc dust, 0.25 mol ammonium chloride catalyst, and 100 ml. of water. The tube was sealed shut and agitated for seven hours at a temperature of 45° C. The resultant gas phase gave the following mol percent analysis based on the $CCl_2F_2$ present at the beginning:

| | |
|---|---|
| $CCl_2F_2$ | 78.9 |
| $CHClF_2$ | 2.2 |
| $CH_2F_2$ | 11.3 |
| $CF_3Cl$ | 0.6 |

Example 2.—The same equipment and proportions of reactants were used as described in Example 1. The tube was agitated for seven hours at 86° C. The resultant gas phase gave the following mol percent analysis based on the $CCl_2F_2$ present at the beginning:

| | |
|---|---|
| $CCl_2F_2$ | 45.3 |
| $CHClF_2$ | 1.0 |
| $CH_2F_2$ | 1.0 |
| $CHF_3$ | 1.6 |

Example 3.—The same equipment and proportions of reactants were used as described in Example 1. The tube was agitated for seven hours at 132° C. The resultant gas phase gave the following mol percent analysis based on the $CCl_2F_2$ present at the beginning:

| | |
|---|---|
| $CCl_2F_2$ | 66.8 |
| $CHClF_2$ | 1.4 |
| $CH_2F_2$ | 2.3 |
| $CF_3Cl$ | 0.5 |
| $CHF_3$ | 2.5 |

Example 4.—Into a 250 ml. stainless steel tube were placed 0.5 mol $CCl_2F_2$, 1 mol zinc dust, 1 mol ammonium chloride catalyst, and 100 ml. of water. The tube was sealed shut and agitated for seven hours at 45° C. The resultant gas phase gave the following mol percent analysis based on the $CCl_2F_2$ present at the beginning:

| | |
|---|---|
| $CCl_2F_2$ | 76.7 |
| $CHClF_2$ | 3.7 |
| $CH_2F_2$ | 13.2 |
| $CHF_3$ | 1.2 |

Example 5.—Into a 250 ml. stainless steel tube were placed 0.5 mol $CCl_2F_2$, 0.25 mol zinc dust, and 100 ml. water containing 5% of sodium hydroxide as a catalyst. The tube was sealed shut and agitated for seven hours at 45° C. The resultant liquid phase gave the following mol percent analysis based on the $CCl_2F_2$ present at the beginning:

| | |
|---|---|
| $CCl_2F_2$ | 96.7 |
| $CHClF_2$ | 1.2 |
| $CH_2F_2$ | 1.8 |

Example 6.—Into a 250 ml. stainless steel tube were placed 0.5 mol $CCl_2F_2$, 0.25 mol zinc dust, 0.25 mol ammonium chloride, and 100 ml. of water. The tube was filled with nitrogen gas under a pressure of 2000 p. s. i. and then sealed. The tube was agitated for seven hours at 45° C. The resultant liquid phase gave the following mol percent analysis based on the $CCl_2F_2$ present at the beginning:

| | |
|---|---|
| $CCl_2F_2$ | 93.7 |
| $CHClF_2$ | 2.8 |
| $CH_2F_2$ | 3.4 |

Example 7.—The same equipment and proportions of reactants were used as described in Example 1. The tube was sealed shut and agitated for 0.5 hour at 30° C. The resultant vapor phase gave the following mol percent analysis based on the $CCl_2F_2$ present at the beginning:

| | |
|---|---|
| $CCl_2F_2$ | 87.2 |
| $CHClF_2$ | 0.3 |
| $CH_2F_2$ | 1.9 |

*Example 8.*—Into a 250 ml. stainless steel tube were placed 0.5 mol $CCl_2F_2$, 0.25 mol zinc dust, 0.25 mold ammonium chloride, and 100 ml. of water containing 1.0 gram of a monooleate of sorbitol-polyoxyethylene condensation product. The tube was sealed and agitated for seven hours at 45° C. The resultant vapor phase gave the following mol percent analysis based on the $CCl_2F_2$ present at the beginning:

| | |
|---|---|
| $CCl_2F_2$ | 62.8 |
| $CHClF_2$ | 3.0 |
| $CH_2F_2$ | 2.5 |
| $CF_3Cl$ | 1.0 |

*Example 9.*—Into a 250 ml. stainless steel tube were placed 0.5 mol $CCl_2F_2$, 1.0 mol zinc dust, and 100 ml. of methyl alcohol. The tube was sealed and agitated for seven hours at 45° C. The resultant vapor phase gave the following mol percent analysis based on the $CCl_2F_2$ present at the beginning:

| | |
|---|---|
| $CCl_2F_2$ | 96.4 |
| $CHClF_2$ | 1.0 |
| $CH_2F_2$ | 2.5 |
| $CF_2ClCF_2Cl$ | 0.1 |

*Example 10.*—Into a 250 ml. stainless steel tube were placed 0.5 mol $CCl_2F_2$, 0.25 mol zinc, and 100 ml. of water. The tube was sealed and agitated for seven hours at 45° C. The resultant vapor phase gave the following mol percent analysis based on the $CCl_2F_2$ present in the beginning:

| | |
|---|---|
| $CCl_2F_2$ | 63.6 |
| $CHClF_2$ | 1.4 |
| $CH_2F_2$ | 15.0 |

*Example 11.*—A two-liter stainless steel autoclave was fitted with a fractionating column and a take-off condenser to form an ordinary distillation apparatus. The autoclave was charged with a mixture containing 376 grams ammonium chloride, 454 grams metallic zinc granules (approximately 30-mesh size), 2300 grams dichlorodifluoromethane, and 400 milliliters water.

The mixture in the autoclave was maintained at a temperature of 81°–85° C. The still pressure was 180–185 pounds per square inch gauge. Hydrogen was produced in the process, which necessitated a bleed-off of the vapors in the condenser from time to time in order to prevent the hydrogen from blocking the column. After two hours of continuous reflux, combined with bleeding off hydrogen from the condenser, the following relative mol proportions of fluorinated methanes were found:

(1) Condensate in condenser

| | Per cent |
|---|---|
| $CCl_2F_2$ | 99 |
| $CHClF_2$ | 1 |

(2) Bleed-off vapors from condenser

| | Per cent |
|---|---|
| $CCl_2F_2$ | 94.9 |
| $CHClF_2$ | 4.0 |
| $CH_2F_2$ | 1.1 |

The process of Example 11 can be operated as a continuous process by continuously introducing feed to the still and continuously withdrawing products from the condenser. The proportions of $CHCl_2$ to $CH_2F_2$ in the product can be varied by changing the still temperatures and pressures. Those skilled in the art of distillation can alter the process variables; such as feed rate, reflux rate, pressure, temperature, etc., so as to maintain optimum conditions for a desired production ratio of $CHClF_2$ to $CH_2F_2$.

In Examples 1 to 5 and 7 to 10, the pressures inside the shaker tubes are developed autogenously, and are in the order of ten to thirty atmospheres. Pressure, in general, is not a critical factor in the process of this invention, although in particular instances, it may be an aid in selectively inhibiting production of certain halogenated products.

The conversions in the process of this invention are favored by low temperatures, that is, below 100° C. In general, the upper limit of temperatures employed in this process is governed by the fact that as the temperature is increased beyond about 300° C., there is an increased production of carbon oxides with higher and higher temperatures until the production of the desired halogenated compounds is no longer commercially feasible. On the other hand, the temperatures may be lowered as far as the freezing point of the aqueous medium in the shaker tube; the process producing substantial amounts of the desired product until the reacting medium solidifies at its freezing point.

In the examples in which shaker tubes are employed, a contact time of seven hours has been shown. This seven-hour period is purely illustrative, and not in any sense is such a time period meant to be critical in the operation of this process. Greater conversions, in general, can be obtained by employing a larger contact period.

Zinc has been shown as the reducing agent in the examples set out hereinbefore. However, other metals may be operable in this invention as a substitute for zinc, for example, metals above hydrogen in the electromotive series, or alloys of such metals.

The catalysts employed in the process of this invention may vary in nature, dependent upon the reducing agent utilized. In processes using zinc as the reducing agent, the catalyst may be selected from the group consisting of acids, bases, and inorganic salts. The employment of reducing agents other than zinc may require a narrower selection of catalysts; for example, it has been found that when iron is the reducing agent of the process described in this invention, the catalyst may be an acid or an acidic salt, but may not be a base or a basic salt.

The products of the reactions shown in the examples given herein may be recovered and separated by ordinary methods of low temperature fractional distillation known to those skilled in the art.

We claim:

1. The process for converting dichlorodifluoromethane to other fluorinated alkanes which comprises intimately contacting dichlorodifluoromethane with metallic zinc in an aqueous medium.

2. The process for converting dichlorodifluoromethane to other fluorinated alkanes which comprises intimately contacting dichlorodifluoromethane with metallic zinc in an aqueous solution of ammonium chloride.

3. The process for converting dichlorodifluoromethane to other fluorinated alkanes which comprises intimately contacting dichlorodifluoromethane with metallic zinc in an aqueous solution of sodium hydroxide.

4. The process for converting dichlorodifluoromethane to other fluorinated alkanes which comprises intimately contacting dichlorodifluoromethane with metallic zinc in an aqueous medium at a temperature below 300° C., and removing monochlorodifluoromethane from the resultant product mixture.

5. The process for converting dichlorodifluoromethane to other fluorinated alkanes which comprises agitating, in a closed vessel, at a temperature below 300° C., and under autogenous pressure, dichlorodifluoromethane and metallic zinc in an aqueous solution of ammonium chloride.

6. The process for converting dichlorodifluoromethane to other fluorinated alkanes which comprises adding dichlorodifluoromethane to a medium cintaining metallic zinc in an aqueous solution of ammonium chloride, maintaining the entire mixture at a temperature of —50° C. to 300° C. in a pressure-containing distillation apparatus, and removing and collecting the converted fluorinated alkanes as the lower boiling components.

References Cited in the file of this patent

UNITED STATES PATENTS

| Number | Name | Date |
|---|---|---|
| 2,344,061 | Renoll | Mar. 14, 1944 |
| 2,590,433 | Blum | Mar. 25, 1952 |